(12) United States Patent
Redmond

(10) Patent No.: US 8,706,815 B2
(45) Date of Patent: *Apr. 22, 2014

(54) MOBILE MULTI-NETWORK COMMUNICATIONS DEVICE

(71) Applicant: Scott Redmond, San Francisco, CA (US)

(72) Inventor: Scott Redmond, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,489

(22) Filed: May 20, 2013

(65) Prior Publication Data

US 2013/0324171 A1    Dec. 5, 2013

Related U.S. Application Data

(63) Continuation of application No. 13/189,815, filed on Jul. 25, 2011, now Pat. No. 8,447,813.

(60) Provisional application No. 61/367,487, filed on Jul. 26, 2010.

(51) Int. Cl.
    *G06F 15/16*    (2006.01)
(52) U.S. Cl.
    USPC ............................ 709/205; 709/217; 709/219

(58) Field of Classification Search
    USPC ................. 709/203, 205, 217, 219, 225, 228; 370/404
    See application file for complete search history.

(56) References Cited

U.S. PATENT DOCUMENTS

| | | | |
|---|---|---|---|
| 7,415,209 B2* | 8/2008 | Heinz et al. | 370/404 |
| 2003/0076846 A1* | 4/2003 | Heinz et al. | 370/404 |
| 2011/0055393 A1* | 3/2011 | Akabane | 709/225 |
| 2011/0153850 A1* | 6/2011 | Akabane et al. | 709/228 |

\* cited by examiner

*Primary Examiner* — Quang N Nguyen
(74) *Attorney, Agent, or Firm* — Stephen E. Zweig

(57) ABSTRACT

A method of operating a Smartphone or other mobile handheld wireless computerized communications device outside of a normal cellular network. The method can be useful for either reducing cellular phone costs, or alternatively when the cellular phone infrastructure is degraded or absent. In such situations, the Smartphone operates in an alternative peer-to-peer wireless network mode, supplemented by optical network links as needed. The method can utilize standard Smartphone functionality such as Bluetooth or WiFi transceivers, light sources, and video cameras, and may be implemented in the form of a standard Smartphone App. The invention may establish a Gnutella-like peer-to-peer networking protocol between nearby Smartphones, and can extend the length of the peer-to-peer network connections by way of longer distance optical links. In alternative embodiments, various Smartphone peripherals can be added to extend the functionality of the peer-to-peer network still further.

17 Claims, 10 Drawing Sheets

MOBILE MULTI-NETWORK COMMUNICATIONS DEVICE

This application is a continuation of application Ser. No. 13/189,815 "MOBILE MULTI-NETWORK COMMUNICATIONS DEVICE", inventor Scott Redmond, filed Jul. 25, 2011; application Ser. No. 13/189,815 in turn claimed the priority benefit of U.S. provisional application 61/367,487 "MOBILE MULTI-NETWORK COMMUNICATIONS DEVICE", filed Jul. 26, 2010, inventor Scott Redmond; the contents of these applications are incorporated herein by reference.

BACKGROUND OF THE INVENTION

1. Field of the Invention

The invention is in the field of wireless communications technology, in particular cellular phone technology and peer-to-peer networking technology.

2. Description of the Related Art

Modern cellular phones, Smartphones, and other mobile handheld wireless computerized communications devices are designed to establish communications links between the phone's wireless cellular transceiver, and one or more cellular phone service base stations or "towers". Thus a call from one cell phone to another typically must be by way of these one or more cellular towers, in which a wireless cellular phone signal first proceeds from cell phone "A" to a first cell tower, the destination analyzed and the call routed by the cellular phone company infrastructure, and the call is then often relayed to a second cell tower, and hence to cell phone "B".

By contrast, traditional walkie-talkies were oriented towards establishing direct wireless communications between a first walkie-talkie and a second walkie-talkie, and this connection could proceed without the need of any intervening cell towers or base stations.

Recently, Swedish company TerraNet has introduced the concept of using peer-to-peer technology that enables users to speak on its handsets without the need for a mobile phone cell tower or base station. These handsets may be adapted to work as peers that can route data or calls for other phones in the network. The handsets also serve as nodes between other handsets, extending the reach of the entire system. This concept has met with some interest for potential third-world applications.

In addition to situations where the existing cellular phone infrastructure is chronically weak or non-existent, other emergency situations can occur where a formerly robust cellular phone infrastructure suddenly becomes problematic or absent altogether. For example, certain natural disasters, such as large earthquakes, hurricanes and the like can act to knock out a previously adequate cellular phone network. Alternatively, there can be man-made disasters or situations, such as terrorist attack, or government sponsored political suppression, where again a previously adequate cellular phone network and/or internet access can suddenly be cut off.

BRIEF SUMMARY OF THE INVENTION

Cellular telephone communications, using standard protocols such as the GSM, TDMA, or CDMA protocols, typically go through a centralized cellular phone service, which usually imposes costs upon the cellular phone users. At the same time, due to the ubiquity of cellular phone communications, standard cell phone communications channels and frequencies can become congested, resulting in dropped calls and limitations on data transfer rates, which are undesirable.

Many cellular phone users, however, often simply wish to establish communications with other local users, often located only a short distance away. For these common uses, routing the cell phone call thorough multiple remote cellular phone towers and networks and paying cellular phone carrier service charges is both expensive and wastes scarce wireless bandwidth resources. Alternatively, as previously discussed, in some emergency situations, even in first world countries, there may be situations where these cellular phone networks may be absent or greatly degraded.

Although the previously discussed TerraNet technology may be used to establish short-range networks with other users, such pure peer-to-peer methods tend to be unreliable for most first-world applications in developed countries. What is needed is a system that can make use of peer-to-peer networking when it is possible, shift to optical peer-to-peer networking when it is useful to supplement the wireless peer-to-peer connections, but which can then fall back to more traditional cellular telephone communications methodology when it is appropriate.

The invention utilizes the fact that most modern Smartphones, as well as other mobile handheld wireless computerized communications devices (such as iPads, tablet computers, laptop computers, and the like), in addition to having one or more long distance transceivers designed to communicate with more remote cellular towers on a non peer-to-peer basis, also have other types of short-range wireless suitable for forming local ad-hoc networks. For example, many Smartphones are equipped with Bluetooth (i.e. IEEE 802.15.1 protocol) transceivers that can communicate in a bi-directional manner with other local Bluetooth transceivers, usually within a distance of about 300 feet. Additionally, some Smartphones are also equipped with WiFi (i.e. IEEE 802.11) transceivers that are also capable of implementing local area networks, and which again often have an effective range of about 300 feet.

The invention is based, in part, on the insight that such Bluetooth or WiFi transceivers can with the appropriate peer-to-peer networking software (which can be uploaded to the Smartphone or other mobile wireless computerized communication device as an application, or which alternatively can be a standard part of the Smartphone application software) be used to form local peer-to-peer networks between Smartphones.

Here, to keep the nomenclature simple, the term "Smartphone" will often be used to describe both Smartphones as well as other mobile handheld wireless computerized communications devices. Thus the teaching herein should not be considered to be limited just to Smartphones, but is broadly applicable to other mobile handheld wireless computerized communications devices as well.

The invention is also based, in part, on the insight that the basic short-range nature of the standard Bluetooth or WiFi links tends to limit the size and physical extent of the peer-to-peer network. This is because due to the short-range nature of most Bluetooth and WiFi connections, there will be natural gaps in the distribution of the peer-to-peer networked Smartphones that will often exceed the short range of the Bluetooth or WiFi transceivers.

The invention is based, in part, on the insight that for some situations, optical communications may be used to fill in these gaps. This is because modern Smartphones, exemplified by the popular Apple iPhone, the Android series, the Blackberry series, and the like have both high intensity light emitting diodes (often provided to allow flash photographs or movies to be obtained in low light situations. Smartphones also have backlit video screens that can be modulated with various patterns, colors, and the like. Additionally, modern Smartphones have video cameras which contain arrays of photodetectors that can pick up changes in light intensity, color, and distribution and, with the proper software, decode such changes in light intensity, color, and distribution back into useful data. At least some Smartphones also have Infrared LEDs and photodetectors as well, which can also be used for such optical communications purposes.

In one embodiment, the present invention is designed to meet a need for communications in modern environments where Smartphones are relatively cheap and ubiquitous, but in which for one reason or another, use of the standard cellular phone system is either not desired or not possible. This invention acts to form peer-to-peer networks that operate by a mix of wireless and optical connectivity methods, thus extending the size and data carrying capacity of the peer-to-peer network.

In some embodiments, the invention may be implemented as software implemented method of operating standard Smartphones. In other embodiments, the invention may be implemented as combination of various types of Smartphone peripherals intended to extend the range of the various wireless or optical peer-to-peer links. Thus an optical peripheral intended to extend the range of the optical link might, for example, incorporate longer range optical or infrared solid state lasers or LEDs as well as photodetectors, amplification circuitry, and analysis circuitry designed to detect high speed (e.g. greater than 1 megabit per second) modulated light signals. Similarly an alternative Smartphone peripheral intended to extend the range of the wireless portion of the peer-to-peer network might contain directional antenna and/or amplifiers designed to extend the range of the Bluetooth or Wireless peer-to-peer network links, or additional transceivers intended to help maintain the peer-to-peer communications network using various low-power wireless transceivers, such as spread-spectrum transceivers. Such spread-spectrum transceivers are particularly advantageous for these purposes because by spreading the transmitter energy over a very wide range of wavelengths, the transceivers minimize the chance of interference with other wireless systems, and also tend to be more robust to interference themselves.

Thus in some embodiments, the invention may be a method of operating a Smartphone, or plurality of Smartphones outside of the normal cellular network. The method can be useful for either reducing cellular phone costs, or alternatively can be useful when the cellular phone infrastructure is degraded or absent. In such situations, the Smartphone operates in an alternative peer-to-peer wireless network mode, supplemented by optical network links as needed. The method can utilizes standard Smartphone functionality such as Bluetooth or WiFi transceivers, light sources, and video cameras, and may be implemented in the form of a standard Smartphone App. The invention may establish a Gnutella-like peer-to-peer networking protocol between nearby Smartphones, and can extend the length of the peer-to-peer network connections by way of longer distance optical links. In alternative embodiments, various Smartphone peripherals can be added to extend the functionality of the peer-to-peer network still further.

Because the Smartphone device, when operating the invention's software, incorporates Peer-to-Peer networking functionality, the invention will occasionally be described in the alternative as a "Peep" device.

DETAILED DESCRIPTION OF THE INVENTION

Figure 1:
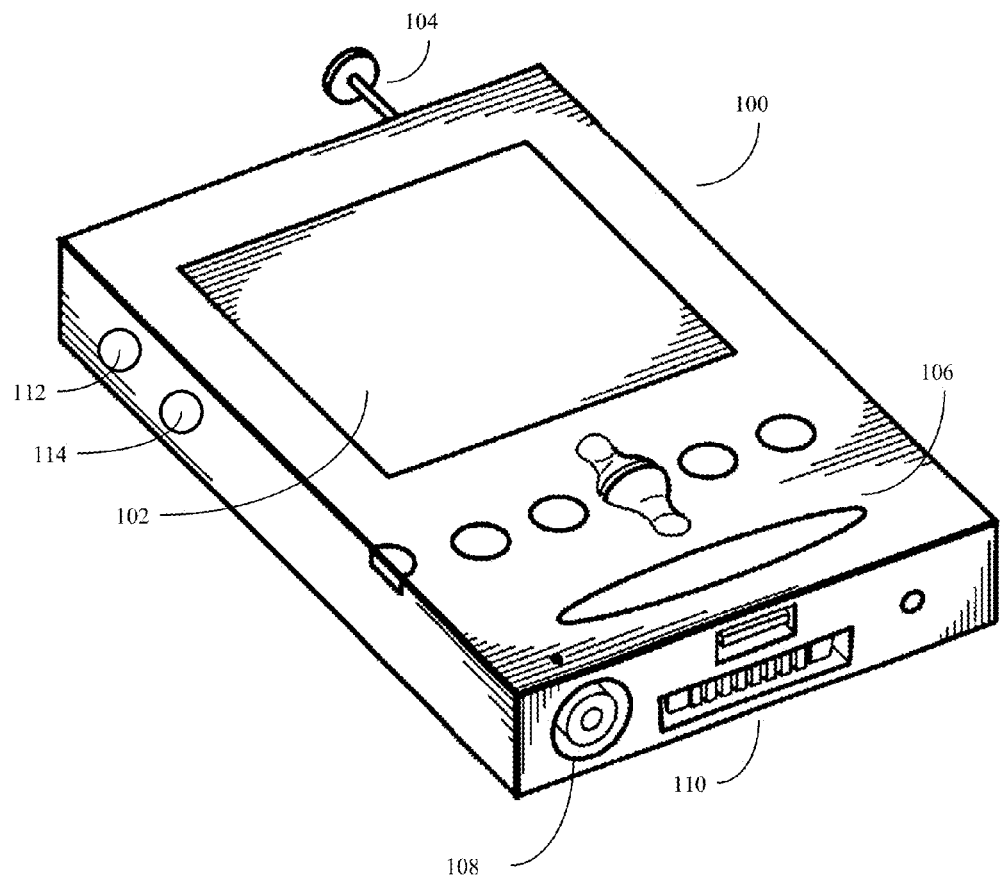
FIG. 1 shows an embodiment of a Peep device, in which the embodiment has a configuration similar to that of Redmond, U.S. design Pat. No. D451,096. Alternatively a standard Smartphone may be used.

In one embodiment, the invention may be a portable wireless voice communications capable device, such as a Smartphone, equipped with a peer-to-peer network server capable of establishing peer-to-peer communications with similar type devices. The device may be powered by a variety of methods, including conventional batteries, fuel cells, and solar cells, and may additionally have an ability to power itself or charge its batteries by harvesting the energy from radio signals.

The device may additionally incorporate other components, such as cameras, video cameras, photodiodes and the like, which may be capable of detecting laser light and light reflected off of surfaces, as well as being able to record pictures and video. The device may have one or more video display screens, which may be touch sensitive screens, and may optionally incorporate an integrated keyboard. In addition to standard cellular telephone wireless transceivers, the device may additionally incorporate WiFi transceivers, walkie-talkie transceivers, Light emitting diodes, and laser diodes in order to increase the device's ability to network with other local devices and systems.

In one common use mode, the device may first attempt to establish communications with a target device, such as another Peep device, using a peer-to-peer network, such as a wireless (radio mediated) or light (e.g. infrared light connected, using a light emitting diode or laser diode) peer-to-peer network. If this peer-to-peer network is unavailable or infeasible, the device may then attempt to establish communications with a target device by falling back to a standard cellular communications protocol, such as a GSM, TDMA, or CDMA protocol.

Alternatively, the device may be configured to prefer to connect to a standard cellular phone network first, and then fall back to peer-to-peer mode when the standard cellular network is unavailable, or upon user choice.

The Peep device (e.g. a Smartphone equipped with the invention's Peep software) may be equipped to detect a variety of different local networks, such as WiFi or Bluetooth networks, and attempt to connect to these networks when available. The system may send out a feeler signal (e.g. a Gnutella like "ping") and/or to also attempt to send signals across portions of the wireless spectrum that are normally reserved for other uses, but which have spacer regions or blank regions (e.g. the blank edge of video screen data in digital TV or radio transmissions).

In addition to use for voice and video or image transmission, the Peep networks may include social network and multi-function social network functionality. An example of such additional functionality is shown in copending application Ser. No. 11/835,415, the contents of which are incorporated herein by reference.

Although often the methods of the invention will be implemented by uploading software to a standard Smartphone (e.g. an Apple iPhone, Android Smartphone, and the like), in alternative embodiments, dedicated custom devices may also be created to implement the invention.

FIG. 1 shows a diagram of the exterior of one embodiment of a custom-built Peep device (100), here modeled after the examples shown in U.S. design Pat. No. D451,096, the contents of which are incorporated herein by reference. The device may often be a pocket sized handheld device that includes a video display screen (102), at least one antenna (104), a microphone (106), a sound output device (e.g. speaker or an earphones plug) (108). The device may also contain plugs for inputting and outputting data, and optionally power (110). The device may additionally contain photosensors, such as light sensors or cameras (112) and light output devices, such as light emitting diodes or laser diodes (114). The device may also contain various switches and buttons.

In this embodiment, the Peep device is thus a mobile handheld wireless communications device. It will typically comprise components and/or functionality that includes a peer-to-peer network server, at least one wireless transceiver (often at least one of these wireless transceivers will be a standard cellular phone GSM, TDMA, 3G, 4G, or CDMA transceiver). To enable voice communications, the device will typically have at least one microphone and at least one sound output device. This sound output device may be one or more speakers, or alternatively may be audio circuitry and an output jack for headphones or other sound reproduction device.

The Peep device will also often have a light detection device, which may be a camera or video camera, and which may also be a photodetector, such as a photodetector configured to detect light mediated data transmission over a local network. The device will often have a video display screen, which in some embodiments may be a touch sensitive video display screen, and/or an optional integrated keyboard. The device will also typically comprise at least one processor, such as a microprocessor (here the ARM family of microprocessors may be useful), and device operating software. The device operating software will often be configured so that when communications are desired with a particular target device, the originator device will first use the onboard network sever to try to form a peer-to-peer network with similar devices, using either wireless signals or light signals. If such a peer-to-peer network connection with the target device is not possible, then the originator device may attempt to connect by an alternate means such as by a standard cellular phone wireless transmission method.

Note that even when communications with a particular target device are not desired, the network server in the Peep device may continue to operate to help maintain a local peer-to peer network. Thus the Peep device may be continually transmitting some peer-to-peer network traffic, even when the user is not using the Peep device for his or her own purposes.

In order to not have this continual low-level of peer-to-peer network traffic drain the Peep device's battery, in some embodiments, more than a standard cellular phone rechargeable lithium ion battery may be desired. The Peep device may additionally be configured with fuel cells, solar cells, or wireless energy harvesters capable of supplementing or supplanting the Peep device's battery, thus enabling the device to function as a peer-to-peer network server for prolonged periods of time, while maximizing the devices' battery life. If a fuel cell is used, this may be a removable cartridge type fuel cell. If such energy harvesting or fuel cell devices are used, the Peep device may, in some embodiments, also have a power output connector that would enable the device to supply energy to other external devices. The device may also have standard ports for recharging a standard rechargeable battery as well.

Because the Peep device may often function as a component of a peer-to-peer network, other nodes in the peer-to-peer network may wish to send data through a particular Peep device while maintaining privacy. In these cases, it may be useful to either include encryption and decryption software as part of the device's operating software, and/or include encryption and decryption chips in the device's electronic circuitry. Thus a first Peep device could, for example, communicate through a second Peep device to a third Peep device using various encryption techniques such as public key encryption methods, Data Encryption Standard (DES), Triple DES, and other encryption methods.

The Peep device peer-to-peer network may carry standard voice signals, video signals, text messages, email, and other digital data signals. In some embodiments, it may be useful to configure the Peep peer-to-peer network to additionally convey social network data, personal health monitoring data, computing data, and other data. Here again, for example, the multi-function social network methods previously described in copending application Ser. No. 11/835,415 may be used, and here the contents of Ser. No. 11/835,415 are again incorporated herein by reference to provide specific examples.

Figure 2:
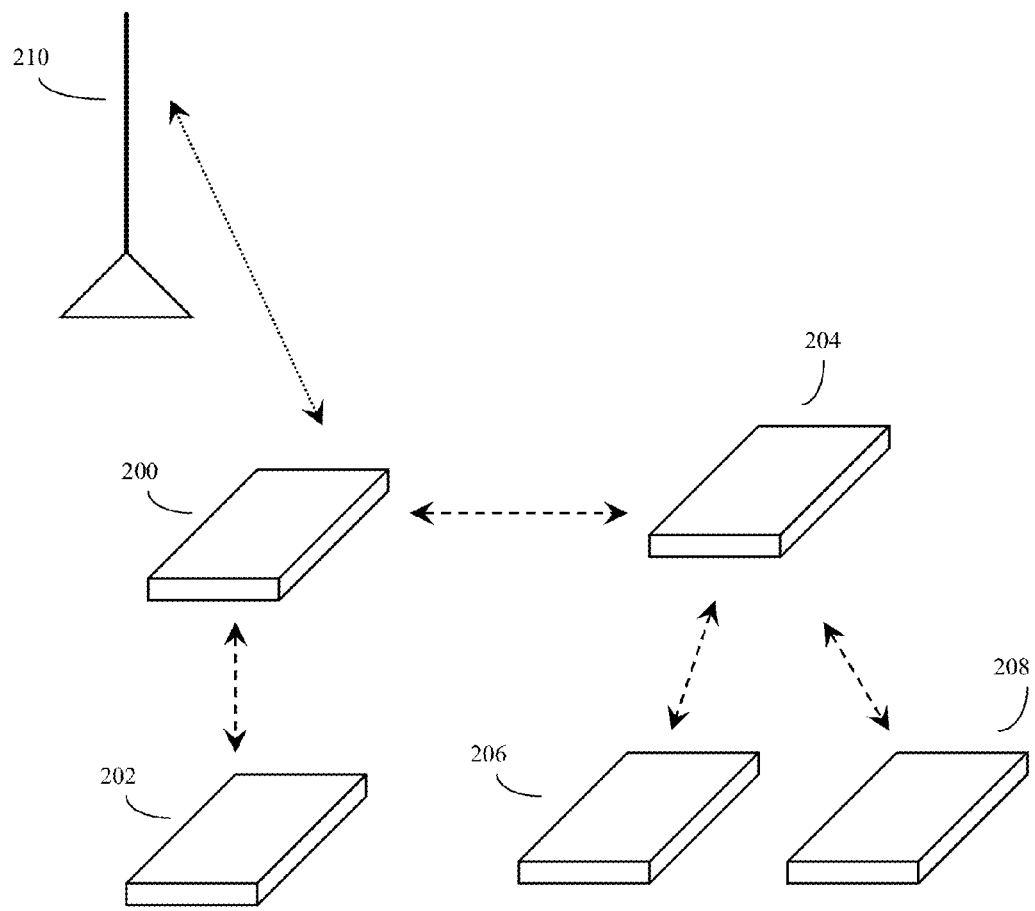
FIG. 2 shows the Peep device/Smartphone in a configuration where it is establishing a local network with other local Peep devices, as well as a longer distance connection to a cellular telephone base station.

FIG. 2 shows various Peep devices in a configuration where they are establishing a local network with other local Peep devices, as well as a longer distance connection to a cellular telephone tower or base station. Here Peep device (200) has established a direct peer-to-peer network connection with Peep device (202) and (204). The network server on Peep device (204) in turn connects Peep device (200) with Peep devices (206) and (208). Thus although Peep devices (206) and (208) are not in direct range of Peep device (200), Peep device (200) may still communicate with them through the peer to peer network.

Peep device (200) may also communicate to a standard cell phone tower or base station (210) as well. Thus, by a combination of peer-to-peer networking and direct cell phone base station connections, Peep devices (206) and (208) may exchange data with the rest of the world through the cell phone base station (210) and the peer-to-peer network.

Figure 3:
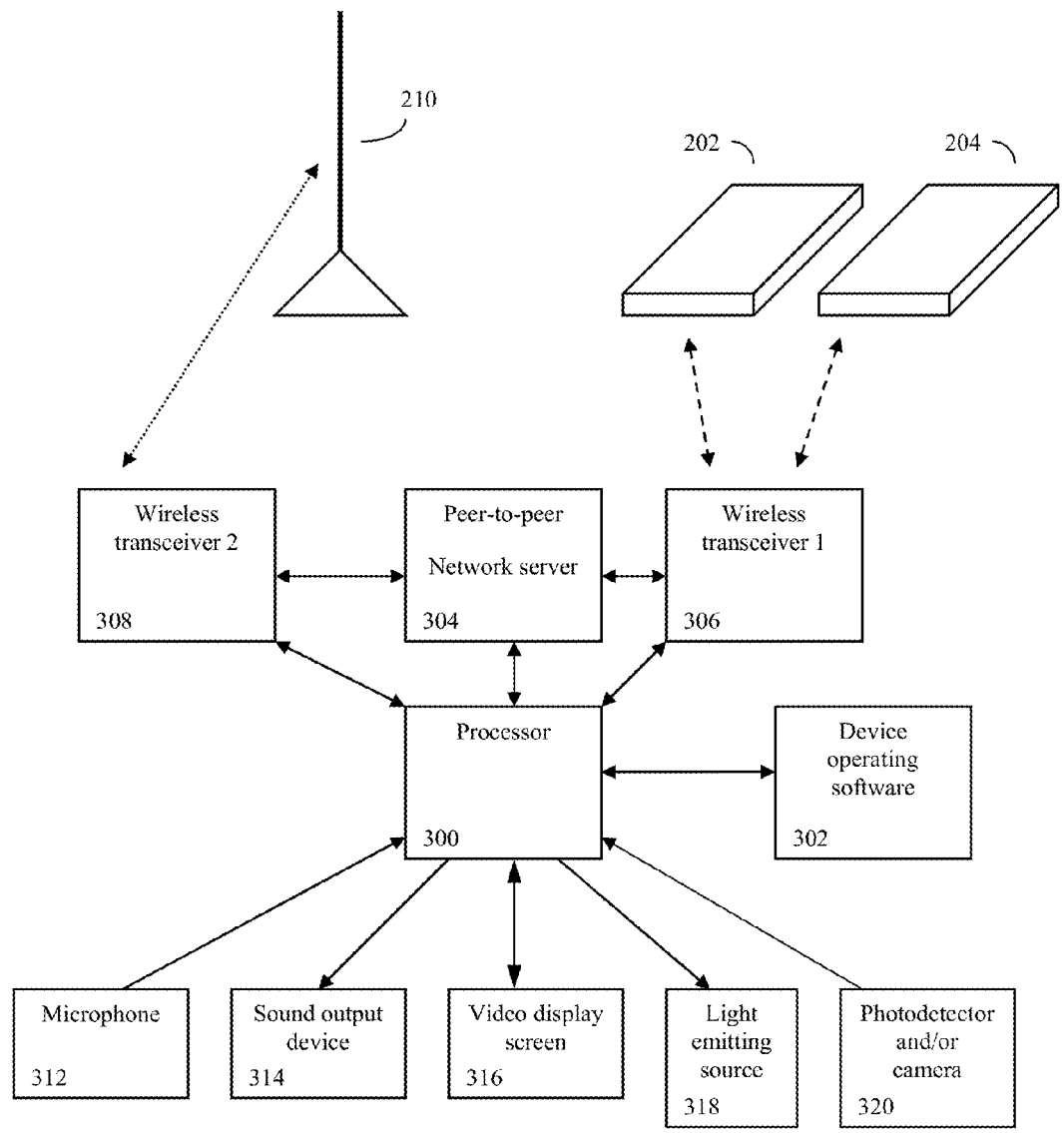
FIG. 3 shows an example of a Peep device/Smartphone electrical circuit and software establishing a local network with other local Peep devices, as well as a longer distance connection to a cellular telephone base station.

FIG. 3 shows an example of a Peep device electrical circuit establishing a local network with other local Peep devices, as well as a longer distance connection to a cellular telephone base station.

The Peep device may often be controlled by at least one processor (300) and device operating software (302). The Peep device will have a peer-to-peer network server or software to implement net server functionality (304), and a wireless transceiver configured (306) to form peer-to-peer connections with other Peep devices (202), (204). This transceiver (306) may be, for example, chosen among various standard cellular telephone GSM, TDMA, or CDMA transceivers, WiFi transceivers, 27 MHz, 49 MHz, or 900 MHz walkie-talkie transceivers, Bluetooth transceivers, or any wireless transceiver capable of connecting the Peep devices into a wireless or optical peer-to-peer network. The Peep device may also contain at least one additional transceiver, such as a standard GSM, TDMA, or CDMA transceiver (308), here shown connecting the peep device to a standard cellular phone tower or base station (210).

The Peep processor will typically send signals to manage or interact with circuitry to control other built-in devices. Examples of these other devices include a microphone (312), sound output device (314), video display screen (316), light emitting source (such as an LED or laser diode (318) used to form an optical peer-to-peer network, or for local high bandwidth data transmission). A photodetector or electronic camera/video camera (320) may be used to receive data from an optical peer-to-peer network.

Figure 4:
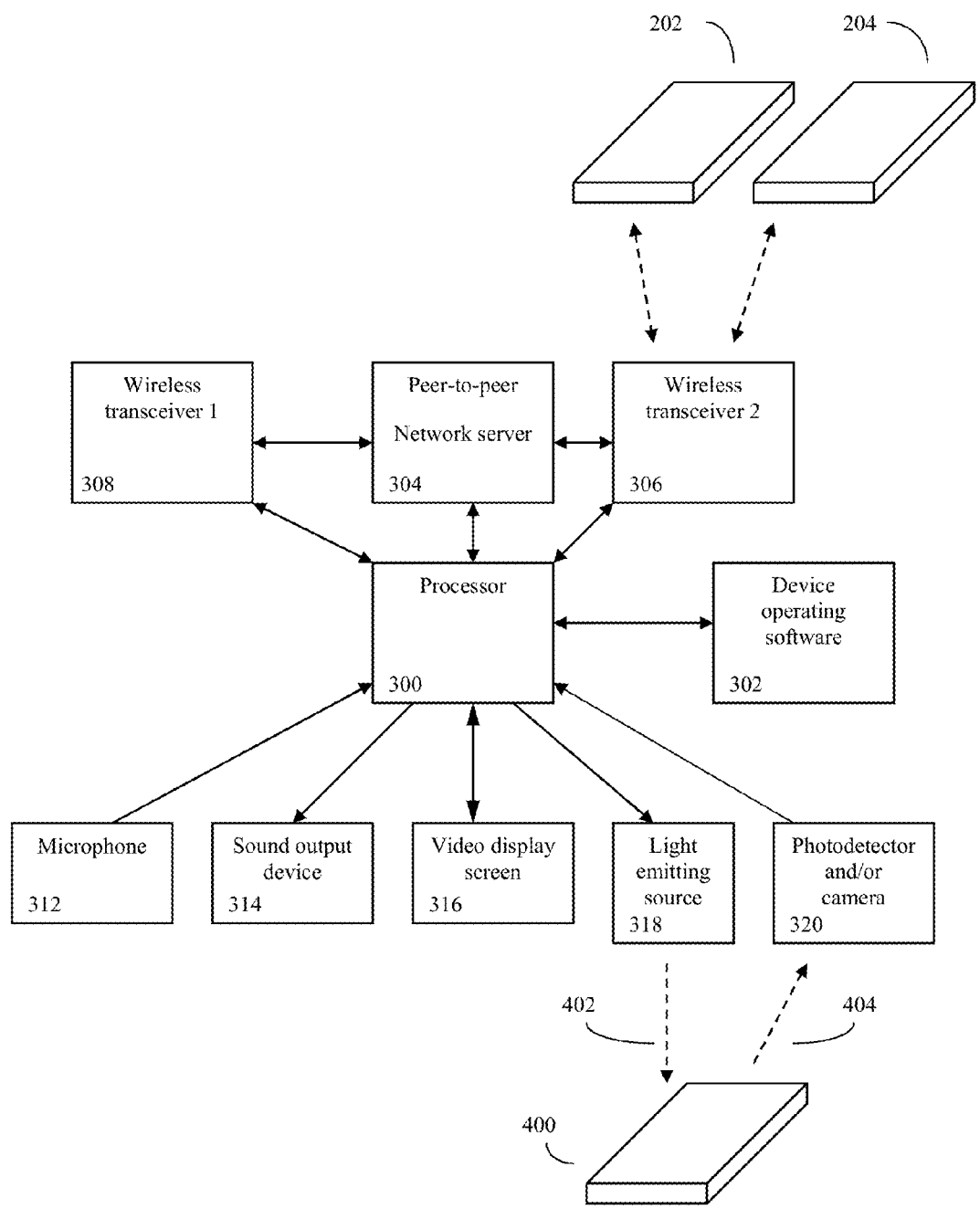
FIG. 4 shows an example of a Peep device/Smartphone electrical circuit and software establishing a network with other local Peep devices, as well as a high bandwidth optical data connection to another local device.

FIG. 4 shows an example of a Peep device electrical circuit establishing a peer-to-peer network with other local Peep devices, as well as an optical data connection to another local device (400). Here the optical network is formed by optical data communications (402) between the light emitting source (318) and the remote device (204), and photodetector or camera (320) (404). Note that in this configuration, device (400) may still form a peer to peer network with Peep devices (202) and (204). This optical modality may be particularly useful for situations, such as hospital or healthcare environments, where wireless RF transmissions may interfere with other sensitive and important electrical equipment. This optical modality may also be particularly good for emergency situations in which access to the normal cellular network infrastructure is damaged or absent, or in which the cellular network infrastructure is not trusted.

Standard Smartphones, such as the popular iPhone, Android series, and the like typically comprise at least one wireless transceiver (often two or more transceivers, including longer-distance standard cellular telephone GSM, TDMA, or CDMA transceivers, as well as optional short-range Bluetooth transceivers and WiFi transceivers). Although often the longer-distance cellular telephone GSM, TDMA, or CDMA transceivers, which are typically designed for non peer-to-peer communication) may not be suitable for use to form peer-to-peer networks, often at least the Bluetooth transceivers and WiFi transceivers can, with the invention's peer-to-peer networking software, be reconfigured to enable the Smartphones to establish peer to peer communication with like configured Smartphones. These Smartphones additionally usually comprise, as standard equipment at least one video camera, at least one light source (which may be a high intensity LED light designed for flash photography, or which may be a backlit video display screen), at least one microphone and at least one sound output device, at least one processor, at least one video display screen, and device operating software, such as iOS for Apple iPhones, the Android operating system for Android devices, and so on.

As a specific example of a Smartphone, consider the popular Apple iPhone 4. This device has a single backlit display screen in front, as well as a forward facing low resolution video camera. The device has a higher resolution (approximately 5 megapixel) rearward facing video camera, with a single high intensity white Light Emitting Diode (LED) positioned near the rear facing camera configured to provide extra light for low light photography. The Apple iPhone 4 has cellular phone transmitters configured for CDMA (Code Division Multiple Access) cellular operation on networks such as the Verizon network, and alternately GSM (Global System for Mobile Communications) cellular operation on networks such as the AT&T network, although presently the device is configured to allow only one of the two transmitters to operate at any given time. The iPhone 4 also has a WiFi transceiver capable of serving as a WiFi hotspot for up to four local WiFi devices, and a Bluetooth Transceiver. The device presently runs on iOS 4.0 operating system software, and is capable of running third party software in the form of "Apps" or applications downloaded from the Apple App store.

As another example of a Smartphone, consider the popular Motorola Droid 3 Smartphone. This device has a single backlit display, a front facing camera, an 8 megapixel rearward facing camera, a single high intensity white Light Emitting Diode (LED) near the rear facing camera configured to provide extra light for low light photography. The Motorola Droid 3 also has cellular phone transceivers (e.g. transmitter/receivers) configured for CDMA (Code Division Multiple Access) cellular operation on networks such as the Verizon network, and alternately GSM (Global System for Mobile Communications) cellular operation on networks such as the AT&T network. The Motorola Droid 3 also has a WiFi 802.11b/g/n capable transceiver capable, and a Bluetooth transceiver. The device presently runs on the Android 2.3 operating system software, and is capable of running third party software in the form of "Apps" or applications as well.

In general, as used in this specification, the term "Smartphone" is intended to encompass a computerized cellular telephone device with at least one computer processor (e.g. one or more microprocessors, exemplified by the popular ARM, MIPS, x86 series or other type microprocessors), memory at least a backlit display screen (video screen), and at least one transceiver capable of connecting with standard cellular telephone networks. If this cellular telephone transceiver is sufficiently software configurable as to enable the cellular telephone transmitter to be reconfigured to work in peer-to-peer mode, then other types of transmitters are not required. However if the Smartphone's cellular telephone transceiver is not sufficiently software configurable for peer-to-peer operation, then the term Smartphone should be construed to additionally encompass other types of transceivers capable of being software reconfigured for peer-to-peer use, such as Bluetooth transceivers or WiFi transceivers. This "Smartphone" will also comprise at least one video camera.

The Smartphone will often but not always comprise at least one high intensity LED. The various components—backlit video screen, transceiver(s) used for peer-to-peer operation, processor, memory, video camera optional high intensity LED will generally be sufficiently controllable by the microprocessor, if necessary with the aid of third party application software (apps), so as, for example, enable the microprocessor and software to modulate the intensity of the backlit screen or high intensity LED, as well as interpret, as a function of time, the intensity and colors from various pixels in the video camera, and convert this information into digital data useful for peer-to-peer networking purposes. Although there need not be any minimum rate (beyond a few changes per second) at which the intensity of the various light sources need be modulated, or any minimum rate (again beyond a few changes per second) at which various pixels on the video camera need be interpreted, in general, the faster the better. That is, higher rates of light modulation and light signal reception will enable the device to work at higher and generally more satisfactory levels of functionality, at least for the purposes of the present invention.

In one embodiment, the invention may be a method of providing peer to peer functionality for such Smartphones. This method will typically comprise implementing network server (e.g. peer-to-peer network server) functionality on the Smartphones, and then establishing wireless peer-to-peer communications with other such Smartphones that are within wireless communication range, thus forming a network of peer-to-peer connected Smartphones.

This network server functionality is more specifically to be construed as peer-to-peer network functionality. This functionality can be done by various methods. This can include pure peer-to-peer functionally, in which all Smartphones on the network may function as equivalent peers, or alternatively some Smartphones may be designated as supernodes. When used in emergency situations where the established cellular telephone infrastructure is either degraded or absent, often peer-to-peer functionality modeled after prior art peer-to-peer methods, such as various Freenet and Gnutella-like methods, may be appropriate.

The Gnutella Protocol is exemplified by "The Gnutella Protocol Specification v0.4", Clip2 Distributed Search Services, the contents of which are incorporated herein by reference. In general, the peer-to-peer network server functionality useful for the invention will include various functions such as Ping, used to discover network hosts, Pong, used to respond to a Ping, Query, used to search the network, Query-Hit, used to respond to a Query, and other functions such as Push to transfer data.

Unlike Gnutella, however the various Smartphones and other devices used as nodes in the network need not always use (although they may often use) standard internet IP addressing conventions (e.g. IPv4, IPv6) to distinguish the various nodes. However although use of standard IPv4 or IPv6 addressing conventions are thus optional, in a preferred embodiment, IPv4 or IPv6 addressing will be used in order to maintain compatibility with the internet and the outside world, and to allow the peer-to-peer network route messages and data between the individual peer-to-peer connected Smartphones and the outside world when such connections are possible.

In a preferred embodiment of the invention, the method will additionally comprise extending the range or data capacity of the peer-to-peer wireless network with additional peer-to-peer optical data connections. This additional peer-to-peer optical component can either be implemented by the standard Smartphone light sources and video camera(s), or it can additionally be supplemented by additional light sources and photodetectors that can be provided in the form of an optional Smartphone peripheral(s).

When used with standard Smartphone optical components, the invention may be a method of using the Smartphone's video camera and at least one Smartphone light source to establish a peer-to-peer network with Smartphones that may not otherwise be within short-range, wireless peer-to-peer communication range of each other, but which are within optical communication range of each other. Thus in this embodiment, the optical data links can act to extending the size and physical footprint of the peer-to-peer network.

In this embodiment, light source may be either the high intensity "flash" LED's used for low light photography that is usually a standard Smartphone component, or the light source may be the backlight for the Smartphone's video display screen.

Various schemes can be used to transmit peer-to-peer data. Essentially any data transmission scheme and optional error correction modality capable of transmitting digital data may be used. These schemes or encoding methods may include protocols as simple as standard Morse code or ASCII, to more sophisticated schemes such as RS232, or the Infrared Data Association (IrDA) transmission protocols (which can be used regardless of the wavelength of the Smartphone's light source) and other methods.

Error detection and correction schemes that may be used by the invention's peer-to-peer data communications methods can range from simple checksums and parity bits, with automatic repeat requests, and error correction code as appropriate, to more complex cyclic redundancy checks and error repeating codes. Generally the higher the data rate, the more complex the encoding scheme and error direction schemes.

Figure 5:
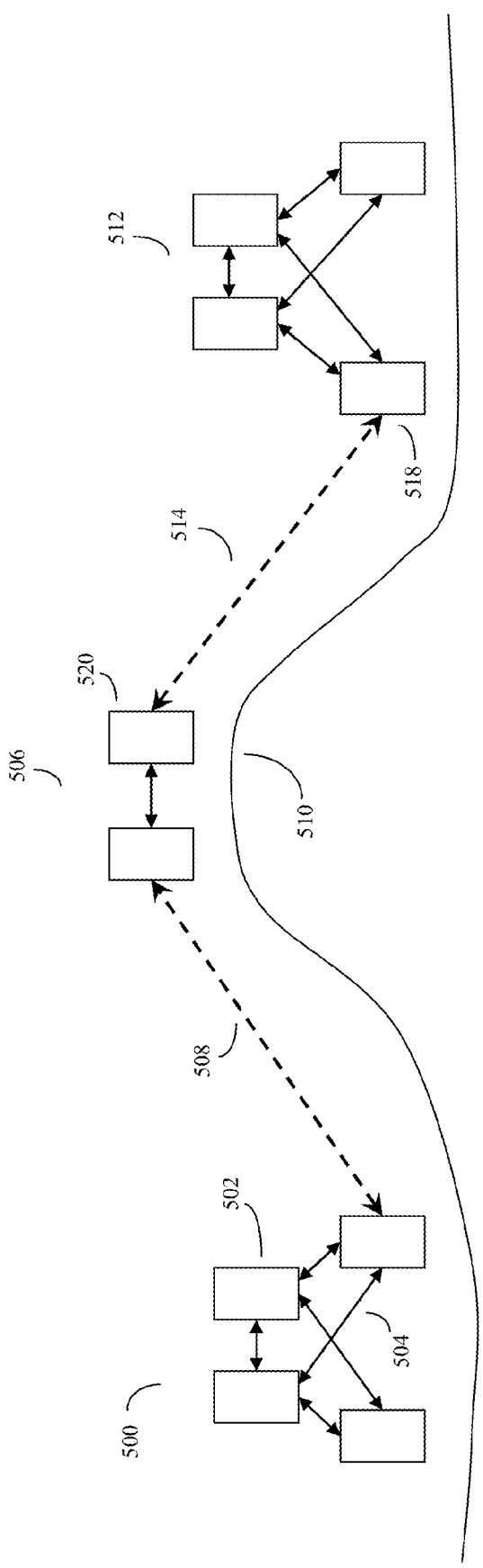
FIG. 5 shows an example of a number of Smartphones, all equipped with Peep software (which may be uploaded to the Smartphones in the form of an app) forming various short-range peer-to-peer local networks, and using optical data connections to span longer gaps between the short range peer-to-peer local networks.

FIG. 5 shows an example of a number of Smartphones, all equipped with the invention's Peep software (which may be either uploaded to the Smartphones in the form of software "App", or alternatively may be installed as part of the Smartphone's operating system). The Smartphones are forming various short-range peer-to-peer local networks, and are using optical data connections to span longer gaps between the short range peer-to-peer local networks. Thus (500) shows a small, four-member, peer-to-peer network comprised of four Smartphones (502) connected together by short-range wireless links, such as Bluetooth or WiFi wireless links (504). This small four-member group in turn is connected by a long-distance optical link (508) to a two-member wireless peer-to-peer network (506).

Under the proper conditions, such as at night, this long optical distance link may operate for up to several miles using standard Smartphone optical components. Although the data rate may not be high under such conditions, it will at least generally enable at least text messages, email, and short Twitter feeds (typically around 140 characters each) to be transmitted throughout the peer-to-peer network.

In this example, the two-member peer to peer network is shown in top of a hill (510). On the other side of the hill (510) is another small four-member peer to peer network (512), optically connected to the two-member peer-to-peer network (506) and hence to the other four member peer to peer network (500) by optical link (514). Assuming proper peer-to-peer network configuration software, then all Smartphones will be connected and can exchange data. If even one Smartphone is in turn connected to the internet, then all will be. Thus in emergency conditions, at least some data to and from the internet can still be transmitted.

In order to facilitate the optical links (508), (514), in some embodiments the communications may work better at night, and in some embodiments, the ability of the cell phone's internal camera may be augmented by attaching the cell phone to simple optical instruments, such as binoculars or telescopes, to extend the range. The optical or wireless range can be extended still further through the use of various plug-in peripherals, some of which are discussed in FIG. 6.

According to the invention, the Smartphone's software will direct the Smartphone's video camera and processor to distinguish the light source (emitted from another transmitting Smartphone) from background light and signals. To do this, the Smartphone's Peep software may instruct the display screen to for show the image that is being received by the Smartphone's camera, and ask the user to select what portion of the image corresponds to the other Smartphone's light source. This information will then tell the Peep software and the Smartphone's processor which pixels from the Smartphone's video camera to use to interpret the signal from the other Smartphone, and which pixels to ignore. This can help improve the signal-to-noise ration of the system, and also improve the range of the system.

In general, the system's peer-to-peer networking software may treat the optical links (508) (514) as if they are generally the same as any wireless link (504). The software may, of course be designed to favor the highest bandwidth or highest capacity links in order to optimize overall peer-to-peer network performance.

Figure 6:
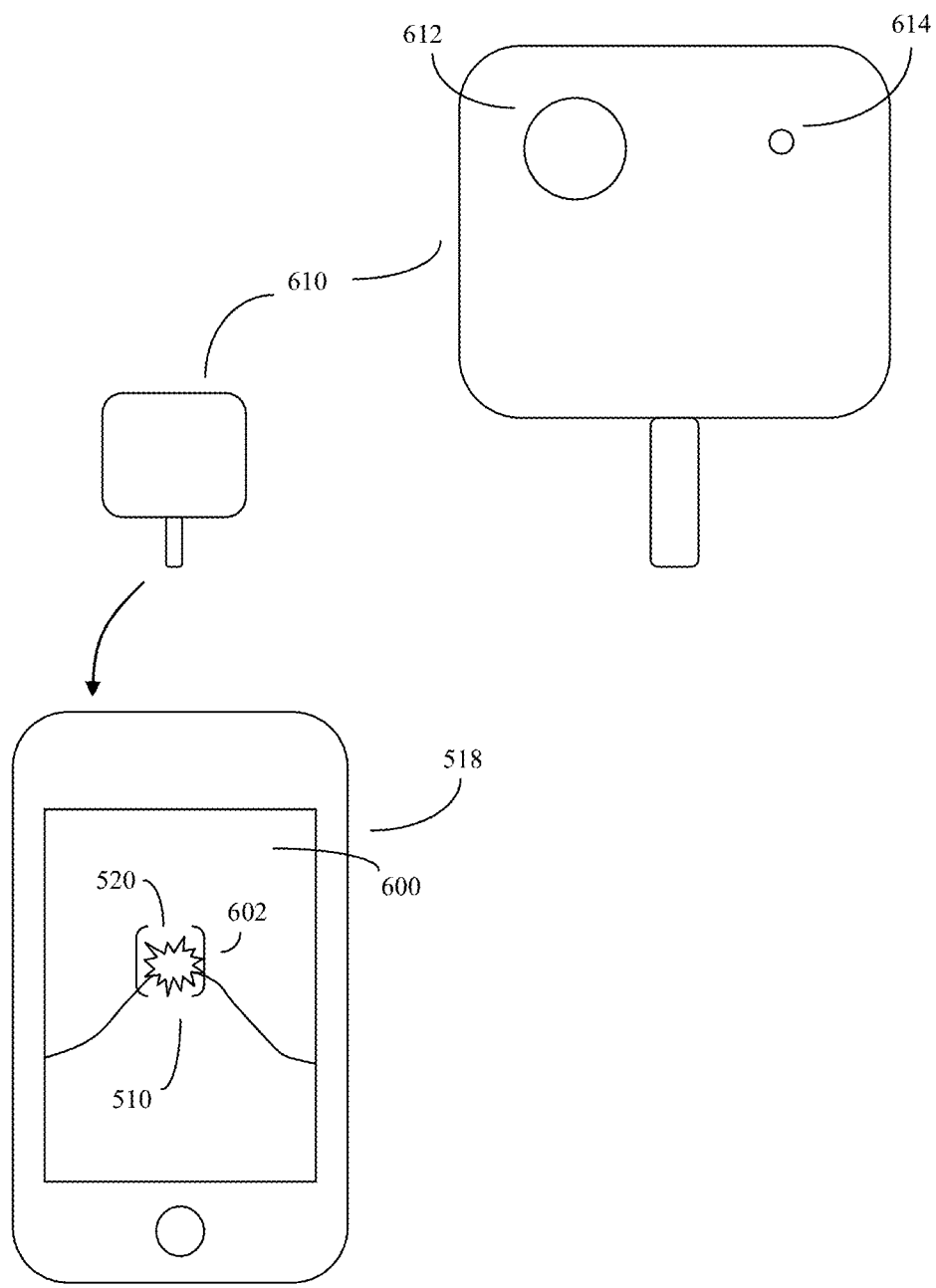
FIG. 6 shows how a Smartphone, equipped with Peep software (which again may be uploaded in the form of an app) may use its standard video camera to identify and lock onto optical signals sent by other Peep equipped Smartphones or other devices. In some embodiments, the range or capability of the Smartphone's standard video camera based photodetectors and light sources may be extended by the use of optional optical range extension peripherals, or wireless range extension peripherals.

FIG. 6 shows how a Smartphone, equipped with the invention's software (which again may be uploaded in the form of an app, and which may be called "Peep" software) may use its standard video camera to identify and lock onto optical signals sent by other Peep software equipped Smartphones or other devices. In this example, assume that the Smartphone (518) has its built in video camera looking at hill (510) and Smartphone (520). The Smartphone's video screen (600) shows both the hill (510) and the light from Smartphone (520). The invention's software can be configured to allow the user to indicate what glint of light corresponds to a transmitting Smartphone, and allow the user to select this light by, for example, moving a target (e.g. a software controlled positioning element) on the Smartphone's touch sensitive display screen (600) to the appropriate location (602). Here assume that Smartphone (518) is configured the same as an Apple iPhone 4, and that the hill (510) is being observed from the real camera (not shown).

Although one of the strengths of the invention is that the invention's software implemented method can work with standard Smartphone devices, in some alternative embodiments, it will be useful to attach various types of Smartphone peripherals to the Smartphones to extend the range of the system further. Such peripherals can include alternate types of wireless transceivers, antennas, or RF amplifiers that may operate over a longer range for wireless peer-to-peer communications, relative to the standard built in Bluetooth or WiFi transceivers.

Such peripherals can also include optical equipment configured for longer range optical data communications as well. An example of such a Smartphone peripheral plugging into a Smartphone peripheral connector (not shown) is shown in FIG. 6 (610). Such a peripheral may contain, for example, longer range light sources such as solid state lasers (614) (either visible or infrared), and faster response time photodetectors (612) which in a preferred embodiment will measure variations in light intensity at a rate that is much (i.e. more than a thousand times) faster than standard video camera video display photodetectors, which often operate at relatively slow video speeds such as 60 frames per second. By contrast, by using the invention's Smartphone optical communication's peripheral, megabit per second or even gigabit per second data transmission rates would become feasible, thus giving the peer-to-peer network a substantially higher data rate and better long distance functionality.

Example

To illustrate some of the inventions mixed optical and wireless peer-to-peer concepts, an Apple iPhone App, entitled Democri-C, was encoded and published on the Apple App store. The non-commercial version of this software runs on standard Apple iPhones, such as the iPhone 4.

Figure 7:
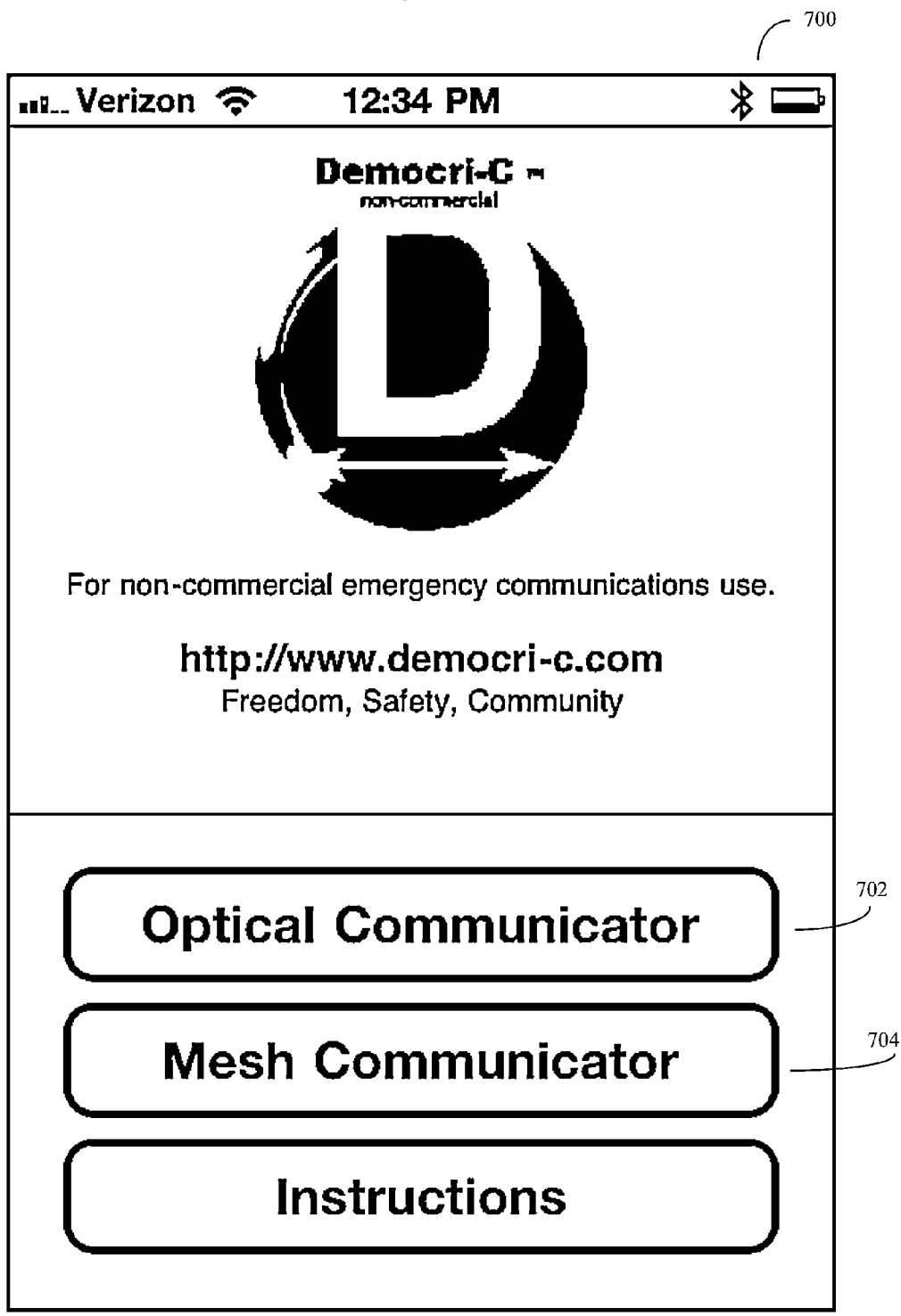
FIG. 7 shows a startup screen from an example Apple iPhone App, called "Democri-C", which enables communications in both wireless mesh or peer-to-peer mode, as well as in a backup optical mode.

FIG. 7 shows a startup screen (700) from this "Democri-C" application which enables communications in both wireless mesh or peer-to-peer mode, as well as in a backup optical mode. In this example, the user is prompted to select either optical mode (702) or wireless mode (704), however in an alternative embodiment, wireless peer-to-peer mode may be enabled by default, and the user will only select optical mode when there is a need to further supplement the connectivity of the wireless mode.

Figure 8:
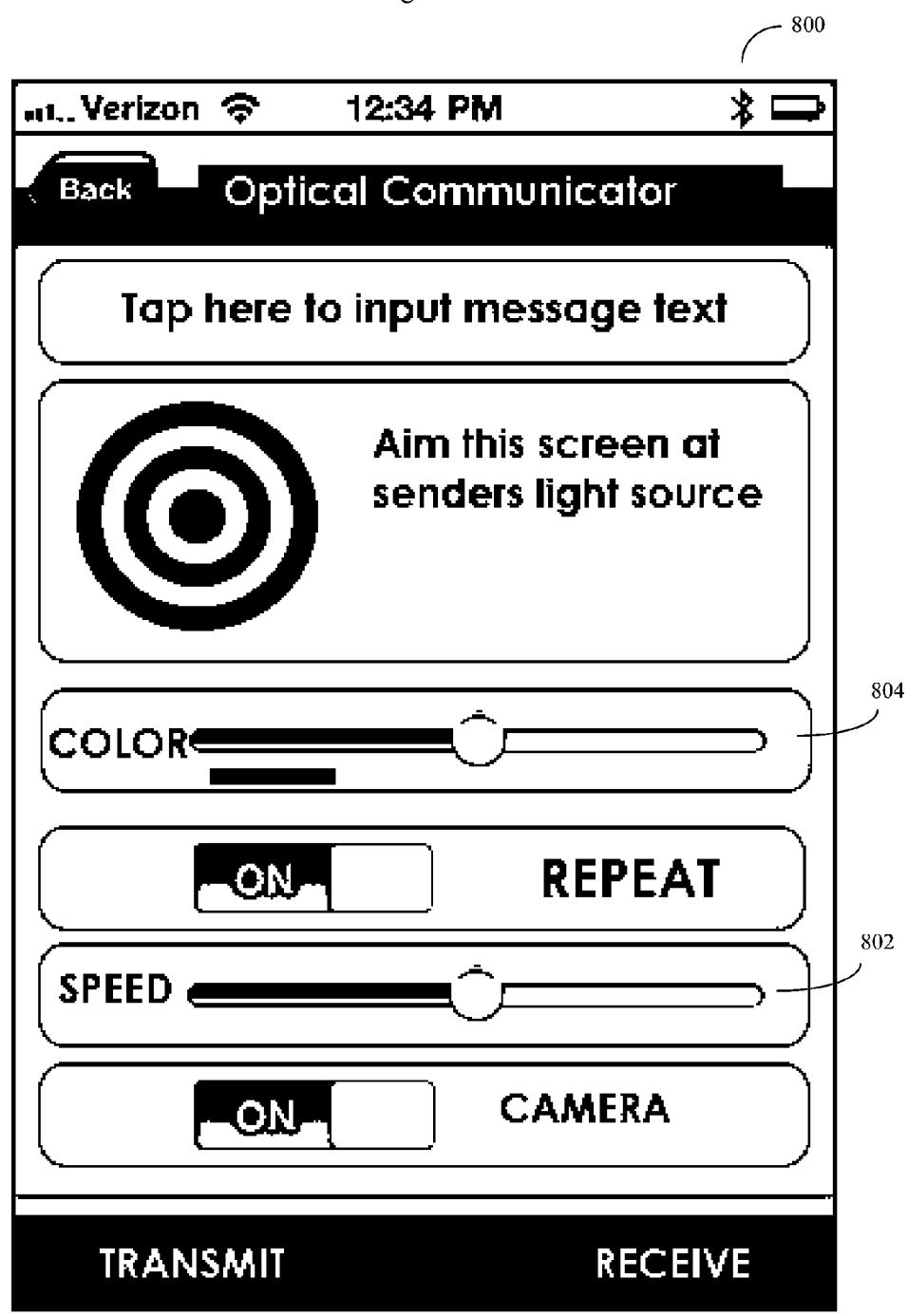
FIG. 8 shows the backup optical data transmission mode for the example Democri-C iPhone App. In this simple example, data is transmitted using standard Morse code, at various user selected speeds, and no checksums or error correction mechanisms are used. The application then modulates the intensity of the display screen backlight to transmit the message. The user can select various colors for the display screen in this mode.

FIG. 8 shows the backup optical data transmission mode for the example Democri-C iPhone App. In this simple example, data is transmitted using standard Morse code, at various user selected speeds (802), and no checksums or error correction mechanisms are used. The application then modulates the intensity of the display screen backlight to transmit the message. The user can select various colors for the backlit display screen in this mode (804). Although in this simple example, text data is entered directly into the optical portion of the App, in a preferred embodiment, the App will seamlessly allow data to be sent and received between the optical and wireless portions of the peer-to-peer network, to the point where a user may not even care if the data is going out over an optical or wireless link to the next peer in the network. In some embodiments, this peer-to-peer network data may be made available to all applications running on the Smartphone, so that the user may make use of conventional browsers and network aware applications just as if the Smartphone was connected to a standard cellular network.

Figure 9:
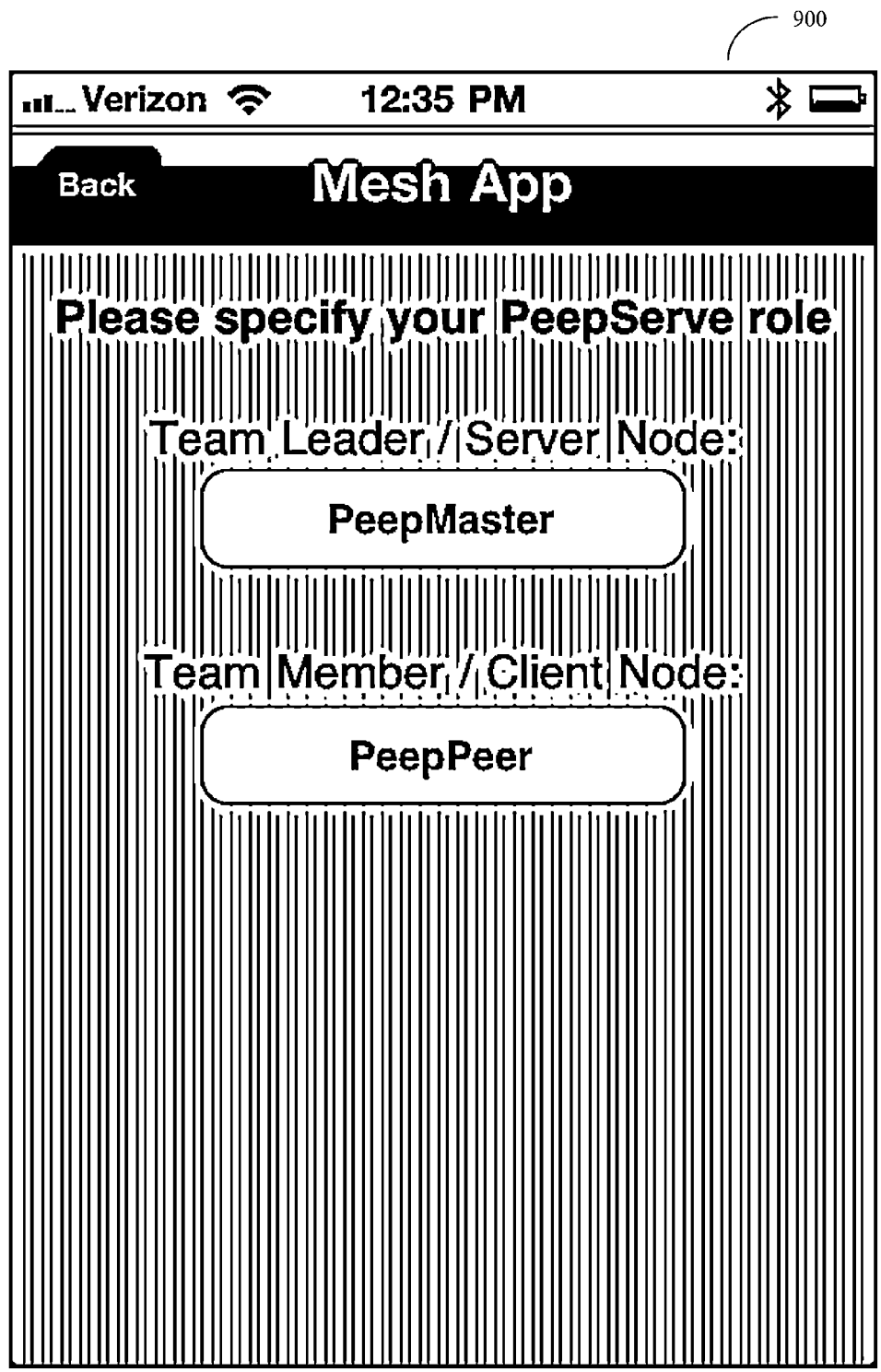
FIG. 9 shows the wireless peer-to-peer mode for the example Democri-C application. In this embodiment, the user has a choice to use his Smartphone as a server node or as a client node.

FIG. 9 shows the wireless peer-to-peer mode for the Democri-C application (900). In this embodiment, the user has a choice to use his Smartphone as a server node or as a client node.

Figure 10:
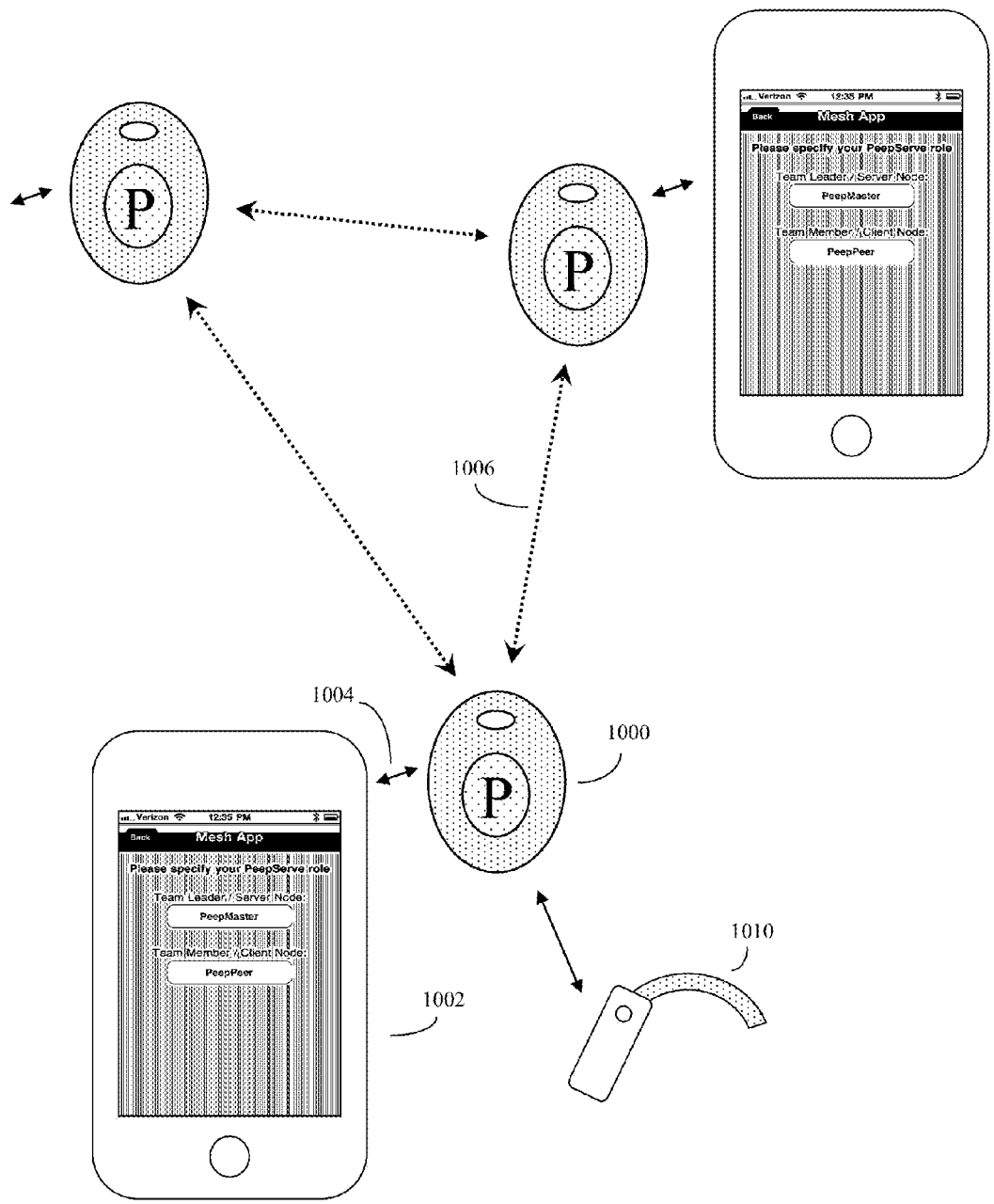
FIG. 10 shows an alternate Smartphone peripheral which, in this example is a small key-fob sized device that can connect to a Smartphone via a Bluetooth wireless link, and in turn create a peer-to-peer network with other like peripherals using an alternate wireless communications modality, such as a low-power spread-spectrum wireless protocol.

FIG. 10 shows an alternate Smartphone "PeepPod" or "PocketPod" peripheral which, in this example is a small key-fob sized device (1000) that can connect to a Smartphone via a Bluetooth wireless link (1004), cable, or other wireless link such as a Zigbee (e.g. an IEEE 802.15.4-like wireless standard) or WiFi link, and in turn create a peer-to-peer network with other like peripherals using an alternate wireless communications modality, such as a low-power spread-spectrum wireless protocol. In an alternative embodiment, users may be able to communicate with the peripheral (1000) directly using a Bluetooth headset (1010) or other device.

Additional advantages and uses of the invention.

An additional advantage of the invention's peer-to-peer network approach is that the more users that use the peer-to-peer network, the more robust the network will become. This is in contrast to standard cellular networks, where performance can degrade as the number of users increase.

Using the "PeepPod" or "PocketPod" peripheral (1000) previously discussed in FIG. 10, a peer-to-peer network could be rapidly established under emergency situations. For example, large numbers of such peripherals could be airdropped or otherwise scattered over the affected area, and quickly establish a peer-to-peer network. Local users could then establish contact with the peer-to-peer network using Bluetooth headsets (1010) or smartphones (1002), and immediately start using the peer-to-peer network.

The invention claimed is:

1. A mobile handheld wireless computerized communications device, comprising:
   a peer-to-peer network server;
   at least one wireless transceiver;
   at least one microphone and at least one sound output device, configured to enable the device to function as a telephone or cellular phone;
   a video camera;
   a visible or infrared light emitting source;
   at least one processor and device operating software;
   a video display screen;
   wherein said device operating software is configured to direct said at least one processor, said at least one wireless transceiver, and said peer-to-peer network server to seek out similar devices, establish wireless peer-to-peer communications sessions with said similar devices that are within wireless communication range of each other, and form a peer-to-peer network of said similar devices;
   wherein said device operating software is further configured to use said video camera and said light source to establish a peer-to-peer network with said similar devices that are not within wireless communication range of each other, but which are within optical communication range of each other, thereby extending the size of said network of peer-to-peer connected devices;
   wherein said light source is either one or more light emitting diodes built-in to said device, or said light source is the backlight for said video display screen;
   wherein said light source transmits peer-to-peer network data according to a Morse code, ASCII, RS232, IrDA, or other digital encoding scheme; and
   wherein said device operating software is further configured to use said video camera and said at least one processor to distinguish said light source from background visual signals, detect the transmission of said peer-to-peer network data, and receive the transmission of said peer-to-peer network data.

2. The device of claim 1, wherein said device operating software is additionally configured to seek out similar devices and establish a light mediated peer-to-peer communication session with said similar devices, and form a network of said similar devices.

3. The device of claim 2, wherein said device operating software is additionally configured to obtain and extract data from said video camera.

4. The device of claim 2, wherein said device operating software is configured to transmit data using said light source, said data conveying data selected from the group consisting of sound data, image data, video data, text data, program data, and digital data.

5. The device of claim 1, in which said device encrypts data and sends data over said network, and receives and decrypts data from said network.

6. The device of claim 1, wherein said at least one transceiver comprises standard cellular telephone GSM, TDMA, or CDMA transceivers, WiFi transceivers, 27 MHz, 49 MHz, or 900 MHz walkie-talkie transceivers, and Bluetooth transceivers, and said transceivers may be used to connect said device to said network.

7. The device of claim 1, wherein said device is configured to operate both as a conventional cellular phone and as a peer-to-peer networked device.

8. A method of providing peer to peer functionality for a plurality of handheld mobile wireless communications devices, each said device comprising at least one wireless transceiver, at least one video camera, at least one light source, at least one microphone and at least one sound output device, at least one processor, at least one video display screen, and device operating software, said method comprising:
   implementing peer-to-peer network server functionality on said devices;
   establishing wireless peer-to-peer communications with other said devices that are within wireless communication range of each other;
   forming a network of peer-to-peer connected devices;
   further using said at least one video display screen of said device to distinguish and designate which pixels from said at least one video camera generate data that comprise background visual signals, and which pixels from said at least one video camera generate data that comprise transmission of said peer-to-peer network data; and
   uploading software to establish said wireless peer-to-peer communications with other said devices in the form of an app, wherein said peer-to-peer network implements Gnutella peer-to-peer network protocols.

9. The method of claim 8, further using said at least one video camera and said at least one light source to establish a peer-to-peer network with said devices that are not within wireless communication range of each other, but which are within optical communication range of each other, thereby extending the size of said network of peer-to-peer connected devices.

10. The method of claim 9, wherein said light source is either one or more light emitting diodes built-in to said at least one devices, or said light source is the backlight for said at least one video display screen;
    And wherein said light source transmits peer-to-peer network data according to a Morse code, ASCII, RS232, IrDA, or other digital encoding scheme.

11. The method of claim 10, further using said video camera and said at least one processor to distinguish said light source from background visual signals, detect the transmission of said peer-to-peer network data, and receive the transmission of said peer-to-peer network data.

12. The method of claim 8, further attaching extended optical range peripherals to at least one of said plurality of devices, each said extended optical range peripherals comprising at least one light emitting diode or solid state laser, and at least one photodetector, and using at least one of said peripherals to establish a peer-to-peer network with said devices that are not within wireless communication range of each other, but which are within optical communication range of each other, thereby extending the size of said network of peer-to-peer connected devices.

13. The method of claim 8, further attaching extended wireless range peripherals to at least one of said plurality of devices, said extended wireless range peripherals comprising at least one directional antenna designed to extend the range of a Bluetooth or WiFi wireless signal beyond 300 feet.

14. A method of providing peer to peer functionality for a plurality of mobile handheld wireless computerized communications devices, each said device comprising at least one wireless transceiver, at least one video camera, at least one light source, at least one microphone and at least one sound output device, at least one processor, at least one video display screen, and device operating software, said method comprising:

implementing peer-to-peer network server functionality on said devices;

establishing wireless peer-to-peer communications with other said devices that are within wireless communication range of each other;

and forming a network of peer-to-peer connected devices;

further using said at least one video camera and said at least one light source to establish a peer-to-peer network with said devices that are not within wireless communication range of each other, but which are within optical communication range of each other, thereby extending the size of said network of peer-to-peer connected devices;

wherein said light source is either one or more light emitting diodes built-in to said at least one device, or said light source is the backlight for said at least one video display screen;

wherein said light source transmits peer-to-peer network data according to a Morse code, ASCII, RS232, IrDA, or other digital encoding scheme; and further using said video camera and said at least one processor to distinguish said light source from background visual signals, detect the transmission of said peer-to-peer network data, and receive the transmission of said peer-to-peer network data.

15. The method of claim 14, further uploading software to establish said wireless peer-to-peer communications with other said devices in the form of an app.

16. The method of claim 14, further extending the optical communication range of at least some of said plurality of devices by further attaching peripherals to at least one of said plurality of devices, each said peripherals comprising at least one light emitting diode or solid state laser, and at least one photodetector, and using at least one of said peripherals to establish a peer-to-peer network with said devices that are not within wireless communication range of each other, but which are within optical communication range of each other.

17. The method of claim 16, wherein at least some of said peripherals contain additional optical lenses, mirrors, or optical-mechanical components to further extend the optical communications range of at least some of said plurality of devices.

* * * * *